July 10, 1956        R. C. CHATTIN        2,753,782
GROUND WORKING TOOL WITH OBLIQUE DEFLECTING SHIELD
Filed Dec. 23, 1952        2 Sheets-Sheet 1
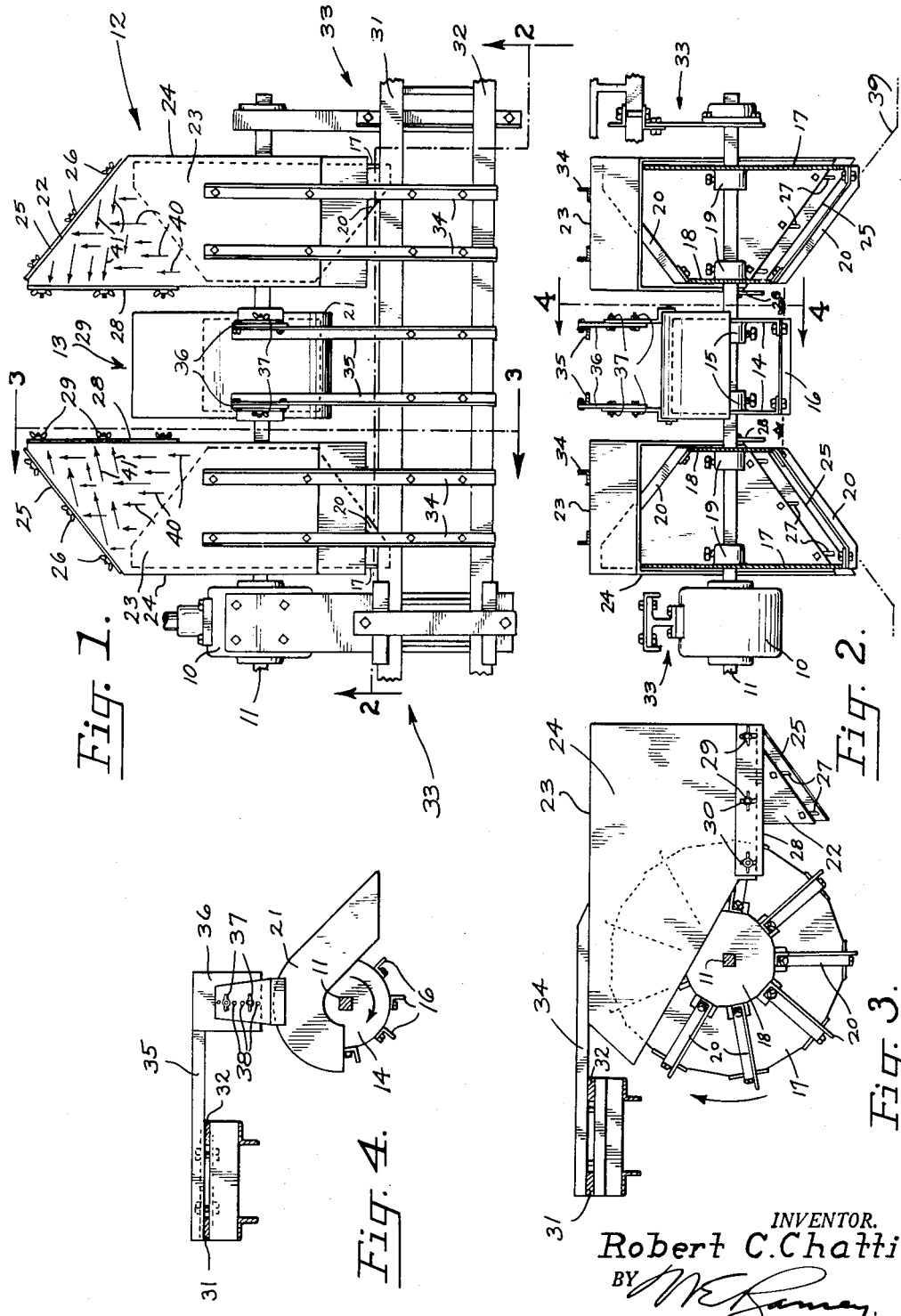
INVENTOR.
Robert C. Chattin

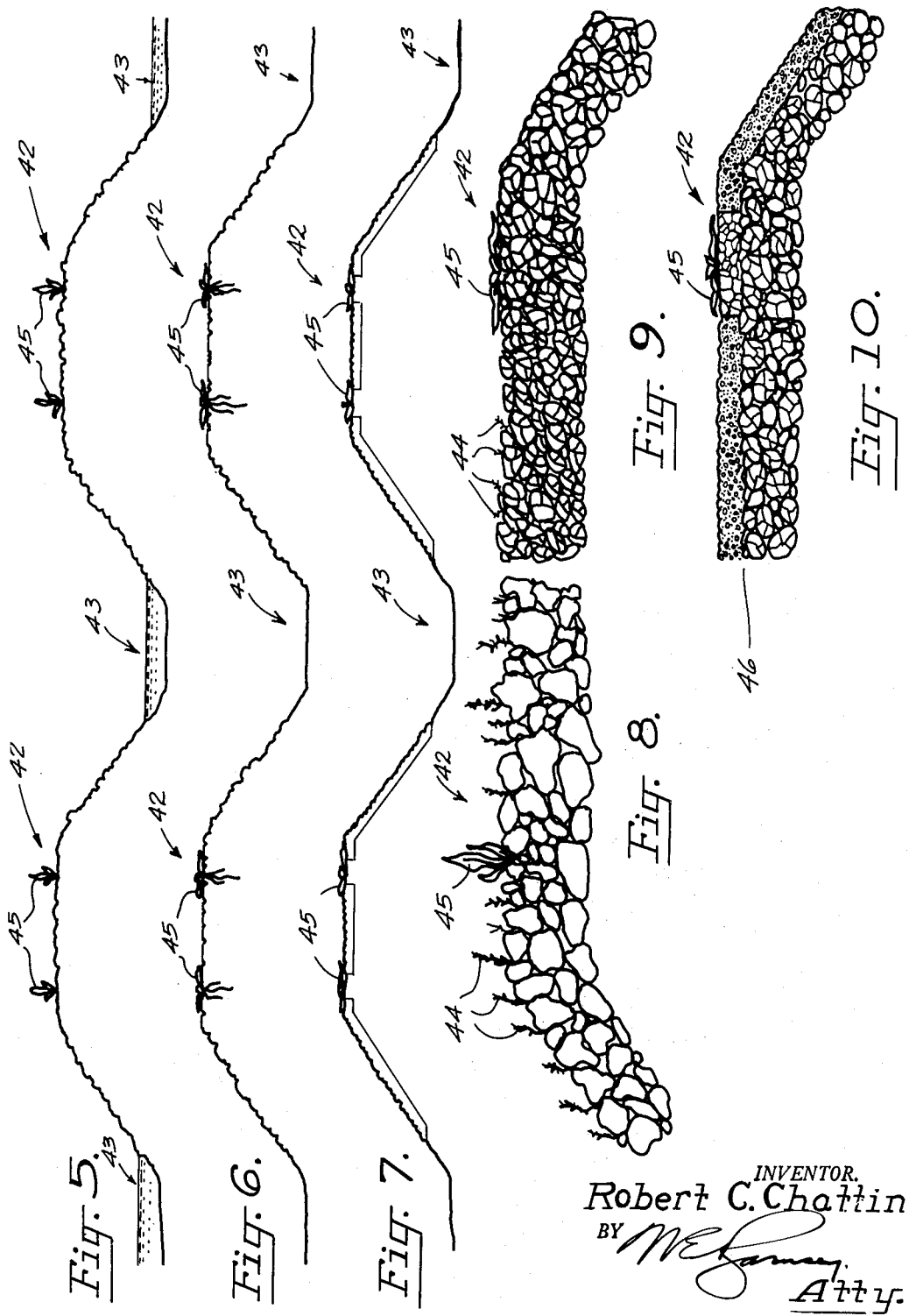

2,753,782
Patented July 10, 1956

2,753,782
GROUND WORKING TOOL WITH OBLIQUE DEFLECTING SHIELD

Robert C. Chattin, Boise, Idaho

Application December 23, 1952, Serial No. 327,641

7 Claims. (Cl. 97—40)

My invention pertains to the cultivation of high bed planting areas such, for example, as the high beds in which lettuce is grown in the Imperial Valley of California. More particularly, my invention is defined both as a method or art for cultivating such planting areas and as a mulching and profiling mechanism which mechanically will cultivate high beds and the sloping sides thereof. In the latter instance, the invention is an improvement upon that found in the copending application Serial No. 83,579, filed March 26, 1949, now Patent No. 2,694,967, entitled Row Crop Cultivator, and of which I am assignee of a one-half interest.

In the Imperial Valley of California, lettuce is grown in high mound-like beds which alternate with irrigation ditches or laterals in order that moisture may be brought to the roots of the lettuce by hygroscopic or subterranean action. Thus, a typical lettuce field in this lush farming area is corrugated in appearance with long alternate rows of high bed planting areas and recessed or depression-like irrigation laterals, the tops of the high beds being flat and having two parallel rows of lettuce planted therein. To bring moisture to the lettuce without wetting the leaves, the irrigation laterals are filled to a low depth and seepage and hygroscopic action are depended upon to bring the moisture up through the high beds to the roots of the plants. In practice, it is found that this method of irrigation produces a superior crop. However, as is evident, the efficiency of such an irrigation procedure directly is related to the porosity of the soil, its condition of cultivation, the weed growth along the sides and top of the beds, and the flow characteristics of the laterals.

Heretofore, it has been the general practice to cultivate and to enhance the irrigation of high bed planting areas in either one of two ways. Firstly, migratory farm labor may be utilized manually to hoe and to cultivate about the tender young lettuce plants in order to break up the crusted, sun baked soil, to eliminate weeds, and to maintain free flow in the laterals. Manual cultivation, as is well known in the art, has become almost prohibitive in cost since the wages for migratory Mexican and other farm labor have risen sharply during the period following World War II. The second method of cultivation which is common may combine a mechanical working with manual labor or may utilize machinery exclusively. In either event, the sloping sides of the high bed planting area first are cut and weeded by passing a pair of tractor mounted knives longitudinally down the rows. These knives are set to pass at a fixed depth below the surface of the sloping sides and parallel thereto from a line immediately outside the rows of growing lettuce plants to a line just above the ditch bottom. Accordingly, they shear away from the slopes that soil which is outboard of the plants while maintaining the same but a more narrow profile. The cut or sheared soil, as is to be expected, immediately sloughs down the slopes into the irrigation ditches because the inclination of the slopes exceeds the angle of repose of the loose soil. Thereafter, if desired, manual labor may be employed to hoe or otherwise to lift, to replace, and to compact the sloughed soil in order to regain the original profile and to re-form the slopes of the beds. Thus, if manual labor is employed, the cost once more is increased. On the other hand, if only the tractor drawn knives are used, the tender roots of the lettuce plants are brought close to the side surface or actually are exposed to the air and the sloughed soil inhibits free flow in the ditches. Further, if the cut sloping sides of the beds are left exposed to the hot sun for any length of time (without a protective cover of cultivated soil), these slopes will bake hard and, thereafter, will not so readily absorb or transmit moisture to the roots. This latter condition makes irrigation less efficient and, hence, does not produce as good a crop or yield as otherwise might be expected.

In view of the above difficulties and disadvantages inherent in the prior art of high bed cultivation, it is a particular object of my invention to provide a method of cultivation which will chop, mulch and fluff the soil along the slopes and, immediately thereafter, will return the cultivated soil to a proper position upon the slopes so as to protect the plant roots, maintain the original profile, and inhibit sloughing off.

A further object of my invention is to provide a mulching and profiling mechanism for high bed cultivation which, after mulching the slopes of the bed, immediately will project the mulched soil laterally with force against the slope in order further to break up the soil and, at the same time, to embed the soil in the slope in maintenance of the original profile. Thus, the cultivated soil will not slough off even though the angle of repose is great.

To the above end, my inventive mulching and profiling mechanism includes a rotary mulcher having a pair of spaced parallel disks mounted for rotation about a common axis passing through the centers thereof. Mounted upon the peripheries of these disks and spanning the distance therebetween, are a plurality of elongated mulching blades arranged at an oblique angle to the common axis and, thereby, defining a frusto-conic outline. Additionally, a shield is provided to encompass and to bound the peripheral outline of the rotary mulcher. This shield carries, as the rear wall thereof, a plane oblique deflector which extends divergently away from the common axis in order that soil which is mulched and is thrown at high speed rearwardly by operation of the rotary mulcher will be deflected from and will ricochet off from the deflector. When this mechanism is operated along the sloping side of a high bed planting area, the soil will be mulched and will be projected rearwardly where contact with the deflector will cause the soil to ricochet laterally and obliquely toward the slope with sufficient force to embed, compact and inhibit sloughing. This action will, at the same time, further break up and cultivate the soil and will set the cultivated soil solidly against and in the slope to maintain the original profile and to protect the plant roots.

The method definition of my invention includes the correlated steps of rapidly cutting from the soil, in a direction parallel to the surface of the slope of the high bed planting area, successive small lateral bites while progressing forwardly along the slope in a direction parallel to the axis of the high bed. The cut soil then is thrown rearwardly and upwardly with force where it is deflected laterally towards and against the sloping sides of the planting area to embed the same in the slope and to inhibit sloughing off.

In summary, my invention seeks to define a method and to provide a mechanism for cultivating the tops and the sloping sides of a high bed planting area while maintaining the original profile thereof and while inhibiting sloughing off of the cultivated soil, said cultivation to proceed without the use of manual labor in order that the cost of the cultivation may be kept to a minimum.

The above and other desirable objects, capabilities and advantages inherent in and encompassed by my invention will become apparent from the ensuing description, taken in conjunction with the accompanying drawings, wherein:

Fig. 1 is a top plan view of a rotary mulcher and shield unit constructed in accord with my invention, a plurality of small arrows being added to this view schematically to illustrate the direction of movement of the soil as it is lifted and projected rearwardly and, thereafter, is deflected laterally against the sides of a planting area;

Fig. 2 is a front view, taken substantially on the line 2—2 of Fig. 1, showing the rotary mulcher and shield in place straddling a two row high bed planting area of lettuce;

Fig. 3 is a side view of an outboard mulching unit, taken substantially on the line 3—3 of Fig. 1, better to indicate the arrangement of the vertically adjustable plates which project downwardly from the shield proper to provide an adjustment for different bed heights in order that predetermined amounts of soil may escape from the rear of the shield;

Fig. 4 is a side detail view, taken substantially on the line 4—4 of Fig. 2, showing an inboard mulching unit and shield together with the vertically adjustable mounting for this shield;

Figs. 5, 6, and 7 are diagrammatic illustrations made in cross section through two adjoining high bed planting areas and the irrigation ditches or laterals on both sides thereof, these figures sequentially illustrating (1) the condition of the planting area prior to cultivation, (2) after rolling or compression but before mulching and (3) after mulching and cultivation in accord with the instant invention; and Figs. 8, 9, and 10 are enlarged diagrammatic illustrations made in the same sequence as Figs. 5, 6, and 7, better to illustrate the condition of the soil and the lettuce plants after each of the aforementioned successive steps of cultivation, Fig. 8 also better illustrating the prolific weed growth common to high beds prior to cultivation.

In the initial preparation of a high bed planting area, several practices are in common use among the farmers and ranchers of the United States. One of these typical preparation operations will be selected as illustrative in order to provide a setting for my invention. Thus, in the Imperial Valley of California, the initial step of preparation is one of plowing and cultivating. Thereafter, a lister is operated back and forth across the cultivated field to pile up alternate mounds and depressions. After listing, a former is employed to level off the tops of the mounds and to give the desired angularity to the cross sectional shape of the high beds. It is the flat top high areas which define the high beds and, conventionally in the Imperial Valley, two rows of crops are planted in each high bed. The intervening low or valley areas, on the other hand, define ditches which serve as laterals for the flow of irrigation water.

Selecting lettuce as a typical high bed crop, two rows are planted, one along each side of the top of the flat bed. After the lettuce sprouts, it becomes necessary to cultivate between the rows and down the sloping sides of the high bed planting area in order that weeds may be cut off and their growth inhibited, the crusted or baked soil may be broken up, and passage of moisture from the irrigation ditches or laterals through the beds may be enhanced. It is this cultivation with which the instant invention is concerned.

Referring first to Figs. 1, 2, 3, and 4, I therein have shown the structure of my mulching and profiling mechanism. This mechanism, as will be understood by those skilled in the art, is suspended from a tractor and rotatively is driven thereby from the power take-off shaft of the tractor. An exemplary power take-off mechanism of this type is illustrated in my copending application, Serial No. 278,256, filed March 24, 1952, and entitled Power Take-Off Mechanism for Tractors. In Fig. 1, however, I have shown only that portion of the power train which terminates with a gear housing 10 which carries a power transfer mechanism for rotating an elongated square rotor shaft 11 upon which the various rotary mulchers are mounted.

In agreement with their relationship to the top and to the sloping sides of a high bed planting area, I have termed the various mulchers "outboard" and "intermediate." Thus, each mulching unit comprises at least two outboard mulchers 12 and at least one intermediate mulcher 13, the unit of Fig. 1 having four outboards and two intermediates of which only one half is shown. With relation to a two row crop, these various mulchers serve to straddle and closely to bound the two crops and approximately to conform to the profile of the bed itself (see Fig. 2).

In detail, each of the intermediate mulchers 13 includes a pair of spaced parallel disks 14 carrying collars 15 for securing the disks to the rotor shaft 11. As is indicated in Figs. 3 and 4, said shaft and the disks carried thereby rotate clockwise as viewed therein. Peripherally, the two disks 14 carry a plurality of elongated mulching blades 16 and the spaced, parallel mounting of the disks is spanned by these blades. Further, as can be seen from Figs. 2 and 4, the disks 14 are of equal circumferential size and the blades 16 are mounted thereon in parallel relationship with each other and with the axis of the rotor shaft 11 to bound a cylindrical outline. Accordingly, the intermediate mulcher is positioned and will function to cultivate the soil between the two crop rows to a uniform depth.

As to the outboard mulchers 12, each of these also is provided with a pair of parallel disks. However, as can be seen in the drawings, the latter disks have different circumferential sizes to define one large outboard disk 17 and one small inboard disk 18. These also are secured to the rotor shaft 11 by means of collars 19. Further, a plurality of oblique mulching blades 20 are carried by the disks 17 and 18 so as to conform to the profile of the high bed planting area. That is to say, each of the blades 20 lies at an oblique angle to the axis of the rotor shaft 11 and the terminal portions thereof are joined to the disks 17 and 18. When one of these outboard mulchers is operated, this oblique disposition of the blades 20 causes the cultivation to proceed at a uniform depth from the surface both of the top of the bed and of the sloping sides thereof as best is shown in Fig. 2.

In conjunction with the three unit mulcher system above described, I have provided a three unit encompassing shield mechanism in which the individual shields are separately maintained and are correlated to the individual mulchers as shown in Figs. 1 and 2. Thus, an intermediate shield 21 encompasses and coacts with each of the intermediate mulchers 13. Each of these shields is provided with side walls which closely bound the ends of the mulcher 13 to protect the plants and the general outline of this shield conforms to the cylindrical outline of the mulcher on a curved vertical sweep. In function, the curved vertical sweep directs the soil downwardly after mulching. The outboard mulchers 12, on the other hand, are provided with allochiral shields each having a rear wall 22, a top wall 23, and two side walls 24. The side walls are parallel and all of these walls are flat or plane in contrast to the configuration of the intermediate shields 21. Further, since these outboard shields are of critical importance to my invention, a detailed description thereof will be made.

As a correlation of Figs. 1 and 2 will indicate, the side walls of the outboard shields extend rearwardly from a point adjacent the axis of the rotor shaft 11. They do not, however, extend rearwardly equal distances. Thus, the inboard walls (those adjacent the intermediate shield 21), project rearwardly a greater distance than the outboard walls (those spaced laterally from the intermediate shield 21). The rear wall 22 spans the distance between the side walls 24 and is secured to the rear margins thereof. Thus, the rear wall 22 is arranged at an oblique angle both to the side walls 24 and to the axis of rotation of the rotor shaft 11 to define a plane oblique deflector. Further, as shown in Figs. 1 and 3, a vertically adjustable plate 25 is mounted, as by wing nuts 26 and slots 27, upon the lower edge of the rear wall 22. This plate provides adjustability for the deflector and can be varied by manipulation of the wing nuts 26, to vary relative proportional amounts of soil which are deflected laterally and which are allowed to escape rearwardly. In total, the deflector and plate serve to direct the soil laterally against the sloping side of the bed to compact and re-form the side and thus to prevent sloughing off. In combination therewith, the inner one of each pair of side walls 24 is provided with a similar vertically adjustable plate 28 which is mounted by similar wing nuts 29 and slots 30. These particular plates are used to adjust the vertical height of each side wall in accord with the height of the bed under cultivation as hereinafter will be explained.

To mount the three unit shield system upon a tractor, I employ a horizontally spaced support mechanism which includes two lateral frame bars 31 and 32 suspended from a tractor (not shown). Adjacent the ends and the middle of these frame bars, a suspension system 33 rotatably supports the rotor shaft 11 and also supports the gear housing 10. As best shown in Figs. 1 and 3, each of the outboard shields is suspended from the frame bars 31 and 32 by means of channel straps 34. The intermediate shield 21, on the other hand, is carried pendent from two channel straps 35 and a hanger 36, vertical adjustment of this shield being accommodated by appropriate wing nuts 37 and apertures 38 (see Fig. 4).

In operation, the mulching and profiling mechanism above described is tractor mounted and is adapted to cultivate a high bed planting area such as is indicated by the dashed profile line 39 in Fig. 2. Thus, the bottom margin of the rear wall 22 and plate 25 of each of the outboard shields extends at an oblique angle to the rotor shaft 11 and both this margin and the configuration defined by the blades 16 and 20 are made to conform to the profile 39. After positioning the mechanism astraddle of two or more high beds, the power take-off on the tractor is actuated to rotate the shaft 11 and thus to rotate each of the mulchers. At the same time, the tractor is made to progress longitudinally down the crop rows at a uniform speed so the blades 16 and 20 will mulch, cut, and chop the soil intermediate the rows of plants and along the sloping sides of the bed.

Referring now to Fig. 1, I have shown two groups of arrows. A first plurality of small arrows 40 are pointed rearwardly and a second plurality 41 are pointed laterally toward the sloping sides of the profile 39. The arrows 40 indicate the direction of movement of the soil as it is mulched, lifted, and projected rearwardly by the blades 20 of each of the outboard units. The arrows 41, on the other hand, indicate the direction of movement of this soil after it is deflected and as it bounces from the rear wall or oblique deflector 22 and plate 25. In practice, of course, the tractor is moving continuously and the soil both along the flap top of the beds and along the sloping side walls thereof is mulched, projected, and deflected in one continuous operation.

After deflection from the rear wall 22 and the plate 25, the soil is traveling in a direction substantially perpendicular to the slope of the bed both because of the angularity of this back wall deflector and because of the pull of gravity upon the individual soil particles. Thus, a majority of the soil will be embedded and will be projected flatwise against and set solidly in the sloping side where it will not slough off, run down, or spill into the lateral but will remain in place. Further, should a portion of the deflected soil be projected too far upwardly, the inboard side wall 24 and/or the plate 28 will catch this soil and drop it along the margin of the top of the bed. Thus, substantially none of the soil will be lost during cultivation, a precise control of deflection and escape is provided, and no manual labor need be employed to follow up after the cultivation.

Attention is directed to the fact that the lowermost or trailing edge of the plate 25 which depends from the oblique deflector 22 lies above the profile line a substantial distance (see Fig. 2). In practice, I space this trailing edge a few inches above the profile line so there will be no drag over the particles at said profile line. If drag occurred, it would glaze the surface and would pull the small soil particles therefrom so that they would slough off into the ditches or furrows between the high beds. To throw the fine particles across this spacing and to prevent them from being airborne requires that they acquire high velocity and that they strike the sloping sides of the high beds almost perpendicularly thereto. The fines then will be and, with my invention, are driven into the embankment and the larger particles are embedded in these fines so the latter then are prevented from rolling, and thus sloughing is minimized.

In the method definition of my invention, the structure previously described (or other structure or manual labor) may be employed rapidly to chop and mulch the soil along the slope of the profile line 39. In any event, Figs. 5 and 8 indicate the cross sectional appearance of a high bed planting area prior to cultivation. As shown in this and Figs. 6 and 7, the planting areas are indicated at 42 and the laterals or irrigation ditches at 43. Initially, of course, the planting areas 42 are infested with weeds as shown diagrammatically at 44 in Fig. 8. Generally speaking, these weeds will be no higher than the growing crop indicated at 45 where that crop is a fast growing plant such as lettuce (see Fig. 8).

Sequentially, Figs. 5 and 8 illustrate a high bed planting area prior to cultivation, Figs. 6 and 9, after rolling or other compaction has taken place, and Figs. 7 and 10, after cultivation or mulching. To compact the beds and thus to crush the large clods of soil, a roller is used which weighs five to six hundred pounds and is of sufficient width to span four or more beds at a time. The effect which this roller has upon a planting area 42 is best shown by comparing Figs. 8 and 9. In the latter figure, it will be noticed that the lettuce shoot 45, the weeds 44, and the large clods of soil have been flattened, pressed down and crushed. More important, the larger clods and chunks are fractured by the compressive force so that mulching thereafter may proceed with increased effectiveness, the lettuce shoots being undamaged by this compression.

Turning now to Figs. 7 and 10, I have illustrated the effect of the method step which is defined as a rapid chopping and mulching of the soil along the slopes and along the top of the planting area 42. This chopping and mulching progresses forwardly along the slope of the high bed in a direction parallel to the axis of the bed and is effective to a preselected depth as indicated at 46. However, these figures also illustrate a further important concept. Thus, while the mulched, cut, and chopped soil has been shown in an exact, desired position at 46, it might be queried why this loose soil does not slough down the sides of the slope as with the prior art cultivation of high beds. With my inventive method, this sloughing does not occur because the soil is projected rearwardly and upwardly with force by the blades 16 and 20, and, thereafter, is deflected laterally toward and against the sloping side by the deflectors 25 to embed the soil in the side and, by compaction, to inhibit sloughing off. At the same time, the lateral deflection of the soil breaks up the previously fractured large clods into still smaller pieces thereby to increase the natural angle of repose of the material. Thus, the soil and the clods are thrown obliquely upwardly and rearwardly where they ricochet obliquely and upwardly with respect to the sloping side wall toward the plants 45, the side walls 24 and plates 28 serving to protect the plants themselves. In summation, this serves to "set" the slope and it is an important part of my invention. The important point is that the bed itself has been re-formed after cultivation without disturbing the root system of the plants. Thus, the porosity and growth promoting condition of the soil have been enhanced, the weeds have been killed, further weed growth has been inhibited, both lateral and vertical compaction have been effected, and the laterals have been kept clear of slough material, all at a low cost and with a minimum expenditure of labor.

In my experimental work with mulchers and the cultivation of high beds, another important factor has been brought forth. Thus, previous attempts to mulch soil of the type found in the Imperial Valley have proven impractical. One factor bottoming this impracticality is the dust cloud and the large amount of fine airborne particles of soil which are raised and thrown about by the mulching process. These fines are separated from the clods and the remainder of the soil and either are blown away by the wind or are settled out in the leaves of the growing plants 45. However, soil particles and dirt in a growing lettuce plant are undesirable since they produce rot and inhibit healthy growth. In the absence of an adequate shielding of the rotor blades and in the presence of a following wind, operation of the rotors or mulchers causes the tractor, the cultivation mechanism, and the operator to be encircled with a cloud of fine dust and airborne soil particles. This not only impairs the operator's vision but it is unsanitary for the operator to breathe such dirt laden air. However, with the shield system above described and in the practice of my cultivation method, airborne dust is driven violently into the ground and clouds substantially can be and are eliminated. Thus, the intermediate shield 21 directs the fines (and the remainder of the soil) immediately downwardly into the top of the bed at high velocity while the outboard shields direct their portion of this material similarly laterally into the sloping sides. In practice, it has been found that this direction or deflection of the fines and clods not only will keep down the dust but, also, will provide a shallow layer of fines along the slopes in which the larger clods will become embedded further to aid in maintaining the original profile and inhibiting slough-off. That is to say, the clods and the fines both are directed against the surface of the mulched bed and the fines surround the clods so that both are driven violently into the ground where they tend to compact, to adhere, and to remain in place.

In summation, I have provided both a method for cultivating high bed planting areas and a mulching and profiling mechanism which mechanically will cultivate such beds and the sloping sides thereof. As particularly related to the sloping sides, my invention will maintain the original profile of the bed while inhibiting sloughing off and will allow cultivation to proceed without the use of manual labor thereby to minimize the cost of growing a high bed crop of superior quality.

I claim:

1. A high bed row crop cultivator, comprising an elongated rotor shaft carrying two outboard mulchers and one intermediate mulcher spaced along the rotor shaft to straddle and closely to bound two crop rows, each mulcher comprising a pair of spaced parallel disks mutually carrying a plurality of elongated mulching blades, the mulching blades of each outboard unit lying oblique to said rotor shaft to define a frusto-conical outline, and a separate shield mechanism bounding each of said mulchers, the shields for said outboard mulchers each having a plane back wall, a top wall and side walls, the plane back wall of each outboard shield extending divergently away from the corresponding outboard disk at an oblique angle thereto and to said rotor shaft to define an oblique deflector.

2. A cultivator for a high bed planting area, comprising a rotatably mounted elongated shaft carrying three rotary mulchers, said mulchers including two allochiral outboard mulchers and one intermediate mulcher spaced from one another along said shaft, each mulcher comprising a pair of spaced parallel disks the peripheries of which mutually carry and are spanned by a plurality of elongated mulching blades, the two outboard mulchers each having one large outboard disk and one small inboard disk, the mulching blades of each outboard unit spanning each of the latter pair of disks and lying obliquely to said shaft to define a frusto-conical outline about said shaft as an axis, and a separate and independently mounted shield mechanism closely bounding each of said mulchers, the shield for said intermediate mulcher being adjustable vertically and being curved on a vertical sweep to closely bound the blades of the intermediate mulcher, the shields for said outboard mulchers being allochiral and each having a back wall, a flat top wall, and parallel side walls, the back wall of each outboard shield extending divergently away from the corresponding outboard disk at an oblique angle thereto and to said shaft to define an oblique deflector.

3. A mulching and profiling mechanism for a high bed planting area, comprising a rotatably mounted elongated rotor shaft having at least three rotary mulchers mounted thereon for rotation therewith, said mulchers including at least two outboard mulchers and one intermediate mulcher spaced one from another along the length of said rotor shaft, each mulcher having a pair of spaced parallel disks the peripheries of which mutually carry and are spanned by a plurality of elongated mulching blades, the disks of said intermediate mulcher being of substantially equal size and the blades carried thereby being substantially parallel to define a cylindrical outline, the two outboard mulchers each having one large outboard disk and one small inboard disk, the mulching blades of each outboard unit spanning each of the latter pair of disks and lying obliquely to said rotor shaft to define a frusto-conic outline, three independently mounted shields encompassing and correlated individually to the three respective mulchers, the shield for said intermediate mulcher being adjustable vertically with respect to the blades thereof and closely bounding both the body and the ends of the blades of the intermediate mulcher, the shields for said outboard mulchers being allochiral and each having a back wall, a flat top wall, and parallel side walls, the back wall of each outboard shield extending divergently away from the corresponding outboard disk at an oblique angle thereto and to said rotor shaft to define an oblique deflector, and a pair of elongated and vertically adjustable plates secured respectively to the lower portion of each said back wall and to the lower portion of the inboard ones of said side walls.

4. A mulching and profiling mechanism for cultivating the sloping side of a high bed planting area, said mechanism comprising a rotary mulcher having a pair of spaced parallel disks mounted for rotation about a common axis passing through the centers thereof, a plurality of elongated mulching blades mounted upon the peripheries of said disks and spanning the distance therebetween, said blades being arranged at an oblique angle conforming to the sloping side of the planting area and defining a frusto-conic outline, a shield closely encompassing said rotary mulcher and having a plane oblique deflector defining the rear wall thereof, said plane deflector extending divergently away from said common axis at an oblique angle progressing from the outboard to the inboard side of said shield and having a vertically adjustable plate projecting downwardly therefrom.

5. A mulching and profiling mechanism comprising a rotary mulcher having a pair of spaced parallel disks mounted for rotation about a common axis passing through the centers thereof, said disks being of different circumferential sizes, a plurality of elongated mulching blades mounted upon the peripheries of said disks and spanning the distance therebetween, said blades being arranged at an oblique angle to said common axis and defining a frusto-conic outline, and a noncircular open bottomed shield encompassing said rotary mulcher and having a plane oblique deflector defining the rear wall thereof, said plane deflector extending divergently away from said common axis at an oblique angle progressing from the outboard to the inboard side of said shield so that soil projected rearwardly by operation of the rotary mulcher will be deflected toward said inboard side.

6. A mulching and profiling mechanism for cultivating the sloping side of a high bed planting area, said mechanism comprising, a rotary mulcher having a pair of spaced disks mounted for rotation about a common axis passing through the centers thereof, said disks being of different circumferential sizes and defining a small inboard disk and a large outboard disk, a plurality of elongated mulching blades having the ends thereof mounted upon the respective peripheries of said disks, said blades being arranged at an oblique angle conforming to the sloping side of the planting area and defining a frusto-conic outline which tapers between said large disk and said small disk, a shield encompassing said rotary mulcher and having a rear wall, two side walls and a top wall, said rear wall spanning the distance between said side walls at an oblique angle thereto and being secured to the rear margins thereof to define a plane oblique deflector, and a vertically adjustable plate defining the bottom margin of said rear wall and lying at an oblique angle to said common axis.

7. A mulching and profiling mechanism comprising a rotary mulcher having a pair of spaced parallel disks mounted for rotation about a common axis passing through the centers thereof, said disks being of different circumferential sizes and defining a small inboard disk and a large outboard disk, a plurality of elongated mulching blades mounted upon the peripheries of said disks and spanning the distance therebetween, said blades being arranged at an oblique angle to said common axis and defining a frusto-conic outline which tapers from said large disk to said small disk, and a noncircular open bottomed shield encompassing said rotary mulcher and having a rear wall, two side walls and a top wall, said two side walls being parallel said two disks and projecting rearwardly from said common axis to define an inboard wall and an outboard wall closely bounding said inboard and outboard disks, respectively, said inboard wall extending rearwardly a greater distance than said outboard wall and having a vertically adjustable plate extending downwardly therefrom, said rear wall spanning the distance between said side walls at an oblique angle thereto and being secured to the rear margins thereof to define a plane oblique deflector.

References Cited in the file of this patent

UNITED STATES PATENTS

| | | |
|---|---|---|
| 709,028 | Mulrony | Sept. 16, 1902 |
| 827,587 | Warner | July 31, 1906 |
| 996,998 | Muggli | July 4, 1911 |
| 1,132,152 | Bell | Mar. 16, 1915 |
| 1,225,547 | Willson | May 8, 1917 |
| 1,276,843 | Wentworth | Aug. 27, 1918 |
| 1,302,543 | Hart | May 6, 1919 |
| 1,319,936 | Wentworth | Oct. 28, 1919 |
| 1,383,294 | Gardner | July 5, 1921 |
| 1,843,095 | Urschel | Jan. 26, 1932 |
| 1,878,442 | Hamshaw | Sept. 30, 1932 |
| 1,935,199 | Albrecht | Nov. 14, 1933 |
| 1,997,564 | Albrecht | Apr. 16, 1935 |
| 2,440,757 | Peters | May 4, 1948 |
| 2,511,091 | Zuckerman | June 13, 1950 |

FOREIGN PATENTS

| | | |
|---|---|---|
| 368,380 | France | Oct. 4, 1906 |
| 398,696 | France | Mar. 30, 1909 |
| 860,198 | France | Sept. 24, 1940 |
| 421,481 | Italy | May 26, 1947 |
| 182,307 | Switzerland | Apr. 16, 1936 |